United States Patent
Inagaki

(10) Patent No.: US 11,626,601 B2
(45) Date of Patent: Apr. 11, 2023

(54) HYDROGEN STORAGE UNIT AND FUEL CELL SYSTEM

(71) Applicant: BROTHER KOGYO KABUSHIKI KAISHA, Nagoya (JP)

(72) Inventor: Mitsuaki Inagaki, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 996 days.

(21) Appl. No.: 16/417,197

(22) Filed: May 20, 2019

(65) Prior Publication Data
US 2019/0273271 A1  Sep. 5, 2019

Related U.S. Application Data

(63) Continuation of application No. PCT/JP2017/034676, filed on Sep. 26, 2017.

(30) Foreign Application Priority Data

Nov. 21, 2016 (JP) ............................ JP2016-226079

(51) Int. Cl.
F17C 11/00 (2006.01)
H01M 8/04 (2016.01)
(Continued)

(52) U.S. Cl.
CPC .......... H01M 8/04216 (2013.01); F17C 11/00 (2013.01); F17C 11/005 (2013.01);
(Continued)

(58) Field of Classification Search
CPC ......... H01M 8/04216; H01M 8/04029; H01M 8/04731; F17C 11/005
See application file for complete search history.

(56) References Cited

U.S. PATENT DOCUMENTS

2003/0203258 A1* 10/2003 Yang ................. H01M 8/04097
429/444
2005/0000234 A1  1/2005 Kimbara et al.
2010/0219087 A1  9/2010 Fujita et al.

FOREIGN PATENT DOCUMENTS

EP  1338554 A1  8/2003
GB  2159263 A   11/1985
(Continued)

OTHER PUBLICATIONS

International Search Report issued in connection with International Patent Application No. PCT/JP2017/034676, dated Nov. 7, 2017. (6 pages).
European search report dated May 25, 2020 issued in corresponding European Patent Application No. 17871779.9 (7 pages).
International Preliminary Report on Patentability issued in connection with International Patent Application No. PCT/JP2017/034676, dated May 21, 2019. (8 pages).

*Primary Examiner* — Ula C Ruddock
*Assistant Examiner* — Frank A Chernow
(74) *Attorney, Agent, or Firm* — K&L Gates LLP

(57) ABSTRACT

To provide a hydrogen storage unit that can heat a storage container including hydrogen absorbing alloy with favorable thermal efficiency, and a fuel cell system provided with the hydrogen storage unit. The cell body of the fuel cell is provided with a fuel cell stack configured to react hydrogen and oxygen to generate electricity, and a stack cooling passage configured to cool the fuel cell stack by circulation of a heat medium. The hydrogen storage unit of the hydrogen supply unit of the fuel cell is provided with: a housing; a plurality of cylinders that are housed in the housing and include hydrogen absorbing alloy; and a temperature control member having a heat medium flowing through the temperature control member so as to heat or cool the cylinder.

18 Claims, 13 Drawing Sheets

(51) Int. Cl.
*H01M 8/04082* (2016.01)
*H01M 8/04029* (2016.01)
*H01M 8/04701* (2016.01)
*H01M 8/0606* (2016.01)
*H01M 8/10* (2016.01)

(52) U.S. Cl.
CPC ......... *H01M 8/04* (2013.01); *H01M 8/04029* (2013.01); *H01M 8/04208* (2013.01); *H01M 8/04701* (2013.01); *H01M 8/04731* (2013.01); *H01M 8/0606* (2013.01); *F17C 2227/0337* (2013.01); *H01M 8/10* (2013.01); *Y02E 60/32* (2013.01)

(56) References Cited

FOREIGN PATENT DOCUMENTS

| | | |
|---|---|---|
| JP | H08-296798 A | 11/1996 |
| JP | H09-242995 A | 9/1997 |
| JP | 2004-346956 A | 12/2004 |
| JP | 2005-063703 A | 3/2005 |
| JP | 2008-303955 A | 12/2008 |
| JP | 2016-090035 A | 5/2016 |
| JP | 2016-157522 A | 9/2016 |

* cited by examiner

FRONT ←→ REAR

LEFT ←→ RIGHT

HYDROGEN STORAGE UNIT AND FUEL CELL SYSTEM

CROSS-REFERENCE TO RELATED APPLICATIONS

The present application is a continuation application of International Application No. PCT/JP2017/034676, filed on Sep. 26, 2017, which claims priority to Japanese Patent Application No. 2016-226079, filed on Nov. 21, 2016. The contents of these applications are incorporated herein by reference in their entirety.

FIELD

The present disclosure relates to a hydrogen storage unit provided with a storage container including hydrogen absorbing alloy, and to a fuel cell system provided with the hydrogen storage unit.

BACKGROUND

A fuel cell is provided with: a fuel cell stack configured to react hydrogen and oxygen to generate electricity; a hydrogen supply unit having a plurality of hydrogen storage units with a plurality of MH (Metal Hydride) cylinders housed in a case; a hydrogen circulation passage; a hydrogen supply passage; and a cooling water passage. Each MH cylinder is filled with hydrogen absorbing alloy. A reaction to occur when hydrogen absorbing alloy in each MH cylinder releases hydrogen is an endothermic reaction, that is, it is necessary to heat each MH cylinder to cause release of hydrogen.

A fuel cell stack is prepared by sandwiching a solid polymer electrolyte membrane with a negative electrode and an anode from both sides so as to form a membrane electrode assembly, arranging a pair of separators on both sides of the membrane electrode assembly so as to construct a tabular unit cell, and laminating a plurality of such unit cells.

It is necessary to cool the fuel cell stack, since heat is generated at the time of power generation. Accordingly, a cooling water passage is formed of piping, and cooling water is circulated so as to cool the fuel cell stack. A pump causes the cooling water to flow into the fuel cell stack and flow through the fuel cell stack, and to flow out of the fuel cell stack after heat is conducted to the cooling water. The water to which heat has been conducted is cooled by heat radiation in a radiator, and then flows through the fuel cell stack again.

JAPANESE PATENT APPLICATION LAID-OPEN NO. 2016-157522 discloses a hydrogen storage unit in which four MH cylinders are housed in a housing of the hydrogen storage unit, and a heater is disposed along the upper surface of the four MH cylinders so as to heat the MH cylinders.

JAPANESE PATENT APPLICATION LAID-OPEN NO. 2005-63703 discloses a fuel cell provided with heating means configured to conduct waste heat of water, which has flown through a fuel cell stack, to an MH cylinder so as to heat the MH cylinder.

SUMMARY

JAPANESE PATENT APPLICATION LAID-OPEN NO. 2016-157522 has a problem that operation of the heater involves generation of costs. Moreover, JAPANESE PATENT APPLICATION LAID-OPEN NO. 2005-63703 does not disclose any specific structure of heating means.

An object of the present disclosure is to provide a hydrogen storage unit that can heat or cool a storage container including hydrogen absorbing alloy with high thermal efficiency, and a fuel cell provided with the hydrogen storage unit.

A hydrogen storage unit according to the present disclosure is characterized by comprising: a housing; a plurality of storage containers that are housed in the housing and include hydrogen absorbing alloy; and a temperature control member that is housed inside the housing and heats or cools the storage container by causing a heat medium to flow through the temperature control member.

A fuel cell system according to the present disclosure is characterized by comprising: the hydrogen storage unit described above; a power generation unit configured to react hydrogen and oxygen so as to generate electricity; and a power generation unit cooling passage configured to cool the power generation unit by circulation of a heat medium, and the heat medium to flow through the temperature control member is configured to use a heat medium which has cooled the power generation unit or to exchange heat with the heat medium.

With the present disclosure provided with a temperature control member through which a heat medium flows and which heats or cools a storage container including hydrogen absorbing alloy, it is possible to heat or cool the storage container with high thermal efficiency.

The above and further objects and features will more fully be apparent from the following detailed description with accompanying drawings.

DETAILED DESCRIPTION

Embodiment 1

Figure 1:
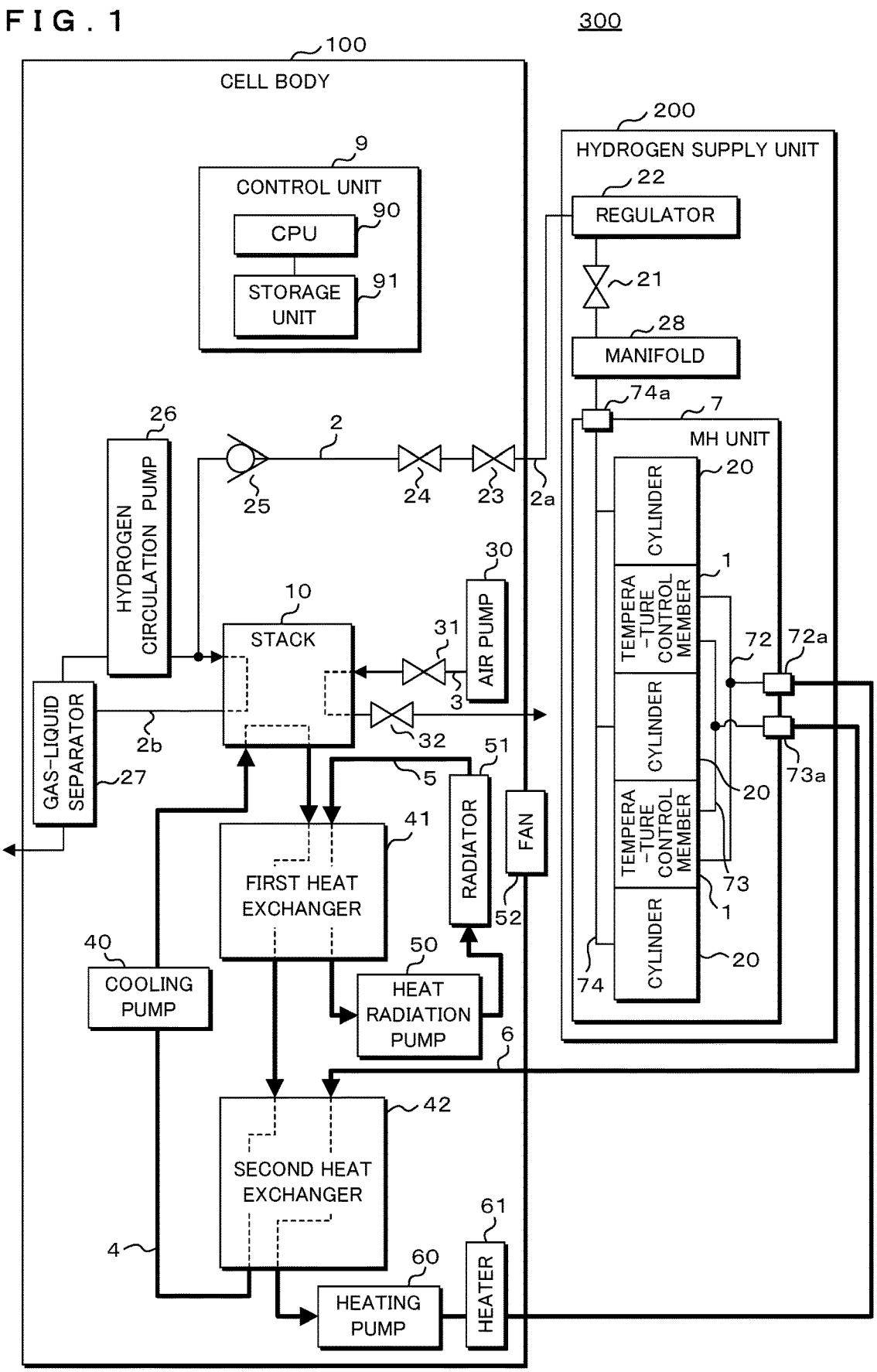
FIG. 1 is a conceptual diagram illustrating the arrangement of the respective components of a fuel cell system according to Embodiment 1.

FIG. 1 is a block diagram illustrating a fuel cell 300 according to Embodiment 1. The front/back, left/right, and up/down directions drawn in the figure are used in the following description.

The fuel cell system 300 is a fuel cell system provided with a polymer electrolyte fuel cell, for example.

The fuel cell system 300 is provided with a cell body 100 and a hydrogen supply unit 200.

The cell body 100 is provided with a hydrogen flow passage 2, an air passage 3, a stack cooling passage 4, a radiator flow passage 5, a cylinder heating passage 6, a control unit 9, a fuel cell stack 10, a hydrogen circulation pump 26, a gas-liquid separator 27, an air pump 30, a cooling pump 40, a first heat exchanger 41, a second heat exchanger 42, a heat radiation pump 50, a radiator 51, a fan 52, a heating pump 60, and a heater 61. The hydrogen flow passage 2 has a hydrogen supply passage 2a and a hydrogen circulation passage 2b.

The control unit 9 is connected with the respect components of the fuel cell system 300 and is provided with a CPU (Central Processing Unit) 90 configured to control operations of the respective components, and a storage unit 91 configured to store an operation program of the fuel cell system 300. It is to be noted that the connection relation between the control unit 9 and each component is omitted in FIG. 1.

The fuel cell stack (which will be hereinafter referred to as a stack) 10 is prepared by sandwiching a solid polymer electrolyte membrane with a negative electrode and an anode from both sides so as to form a membrane electrode assembly, arranging a pair of separators on both sides of the membrane electrode assembly so as to construct a tabular unit cell, and laminating a plurality of such unit cells.

When fuel gas including hydrogen which has flown in from the hydrogen supply unit 200 comes into contact with the negative electrode, and oxidant gas including oxygen such as air from the air passage 3 flows into and comes into contact with the positive electrode, an electrochemical reaction occurs at both electrodes, and electromotive force is generated. In such an electrochemical reaction, water is generated from a reaction of hydrogen ion, which has been transmitted through the solid polymer electrolyte membrane from the negative electrode side, and oxygen in the oxidant gas.

One end portion of the hydrogen supply passage 2a is connected with a regulator 22 of the hydrogen supply unit 200, while the other end portion is connected with a part of the hydrogen circulation passage 2b close to the negative electrode of the stack 10. At the hydrogen supply passage 2a, an opening/closing valve 23, an opening/closing valve 24, and a check valve 25 are provided in this order from the hydrogen supply unit 200 side.

The hydrogen circulation passage 2b is provided with the hydrogen circulation pump 26 and the gas-liquid separator 27. When the opening/closing valve 23 and the opening/closing valve 24 are opened, hydrogen flows from the regulator 22 through the opening/closing valve 23, the opening/closing valve 24, the check valve 25, and the hydrogen supply passage 2a, is caused by the hydrogen circulation pump 26 to flow through the hydrogen circulation passage 2b, is delivered to the negative electrode side part of the stack 10, and is caused to flow through a flow passage in said part. Hydrogen which has flown through such a flow passage and has been discharged from the stack 10 flows through the hydrogen circulation passage 2b and is delivered to the gas-liquid separator 27. In the gas-liquid separator 27, water and gas including hydrogen and impurities are separated, and separated gas is delivered from the gas-liquid separator 27 to the hydrogen circulation pump 26 and is circulated. After a predetermined amount of water separated in the gas-liquid separator 27 is stored, a water discharge valve (unillustrated) is opened, so that the water is discharged. An air discharge valve (unillustrated) is opened with proper timing, so that gas including impurities is discharged to outside.

The air passage 3 is provided with the air pump 30. In addition, an opening/closing valve 31 is provided at an inlet part of the stack 10 of the air passage 3, and an opening/closing valve 32 is provided at an outlet part from the stack 10. When the opening/closing valve 31 and the opening/closing valve 32 are opened, air delivered from the air pump 30 flows through the air passage 3 and the opening/closing valve 31, is introduced to a positive electrode side part of the stack 10, and is caused to flow through a flow passage of said part. Air which has flown through such a flow passage is discharged from the stack 10 and is discharged to outside through the opening/closing valve 32.

The stack cooling passage 4 is provided with the cooling pump 40, the first heat exchanger 41, and the second heat exchanger 42. Cooling water which is delivered from the cooling pump 40 and flows through the stack cooling passage 4 is introduced to the stack 10, flows through a flow passage in the stack 10, is then discharged, and flows through the first heat exchanger 41 and the second heat exchanger 42 back to the cooling pump 40. An example of a cooling liquid is antifreeze composed mainly of ethylene glycol.

The radiator flow passage 5 is provided with the heat radiation pump 50 and the radiator 51. Heat radiation liquid delivered from the heat radiation pump 50 flows through the radiator 51 and further through the first heat exchanger 41 and then returns to the heat radiation pump 50. An example of a heat radiation liquid is antifreeze composed mainly of ethylene glycol. The fan 52 is provided in proximity to the radiator 51.

The cylinder heating passage 6 is provided with the heating pump 60 and the heater 61. The heater 61 is used at the time of activation of the fuel cell system 300 when the atmospheric temperature is low, for example. Heating liquid delivered from the heating pump 60 flows through a flow passage, which will be described later, in the hydrogen supply unit 200, heats each MH cylinder (which will be hereinafter referred to as a cylinder) 20, is then discharged from the hydrogen supply unit 200, and flows through the second heat exchanger 42 back to the heating pump 60. An example of the heating liquid is water or the above antifreeze.

The hydrogen supply passage 200 is provided with an opening/closing valve 21, the regulator 22, a manifold 28, and a plurality of hydrogen storage units (which will be hereinafter referred to as MH units) 7. FIG. 1 illustrates only one MH unit 7. A plurality of MH units 7 are housed in a case (unillustrated).

Figure 2:
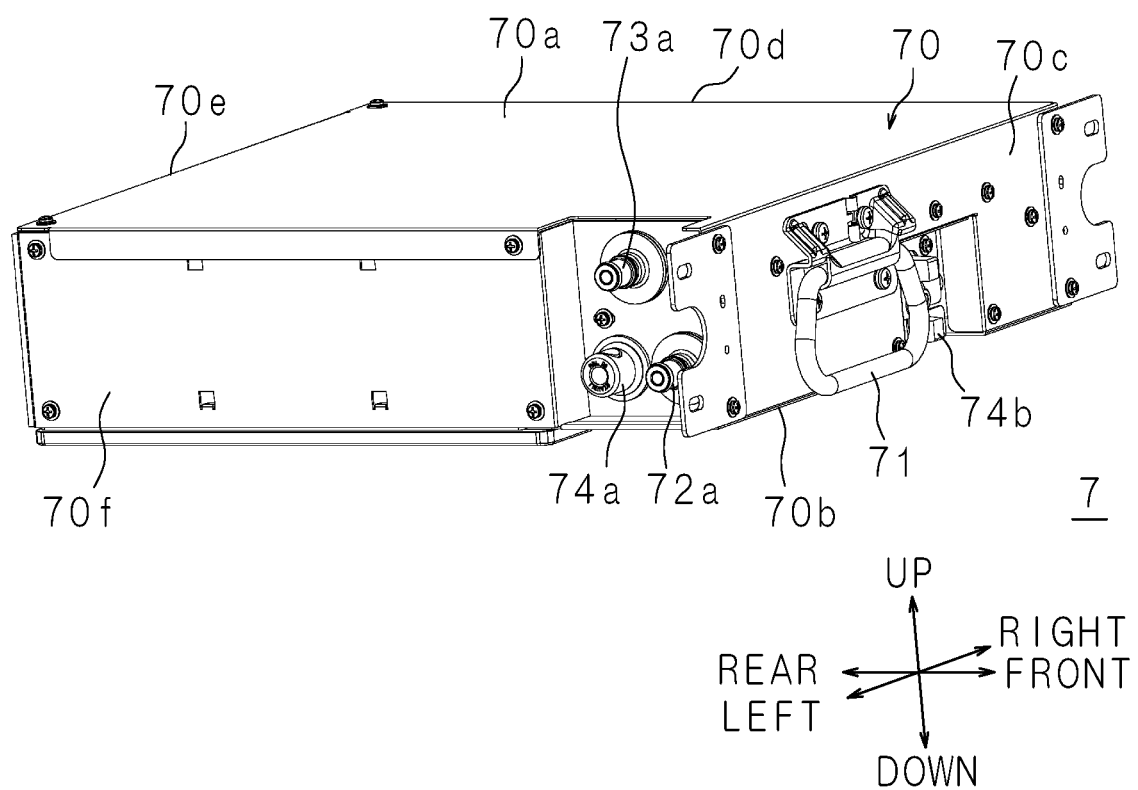
FIG. 2 is a perspective view of an MH unit.
Figure 3:
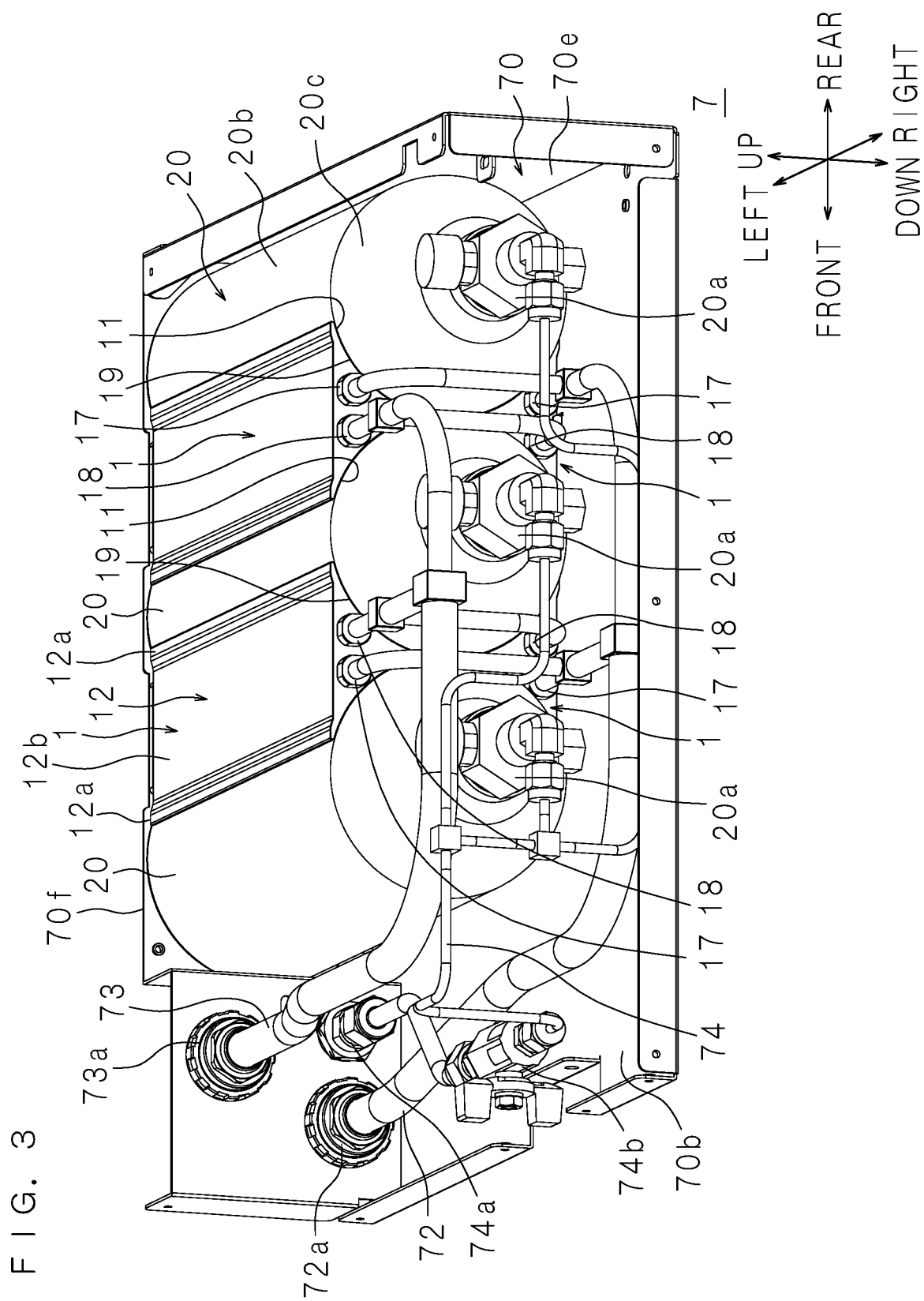
FIG. 3 is a perspective view illustrating a state of an MH unit where an upper plate portion, a front plate portion, and a right plate portion are detached.
Figure 4:
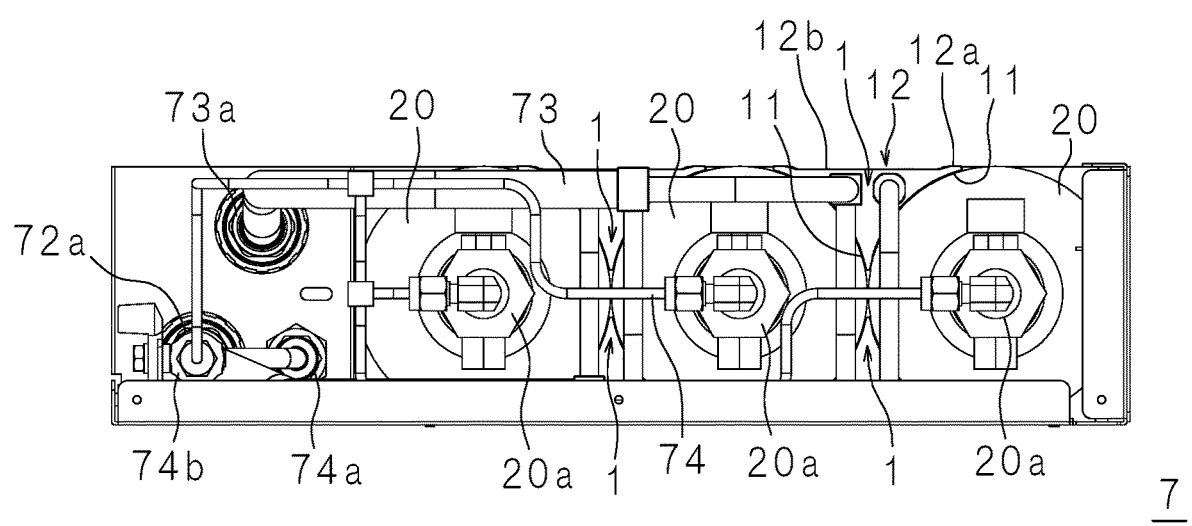
FIG. 4 is a side view illustrating a state of an MH unit viewed from the right side.
Figure 5:
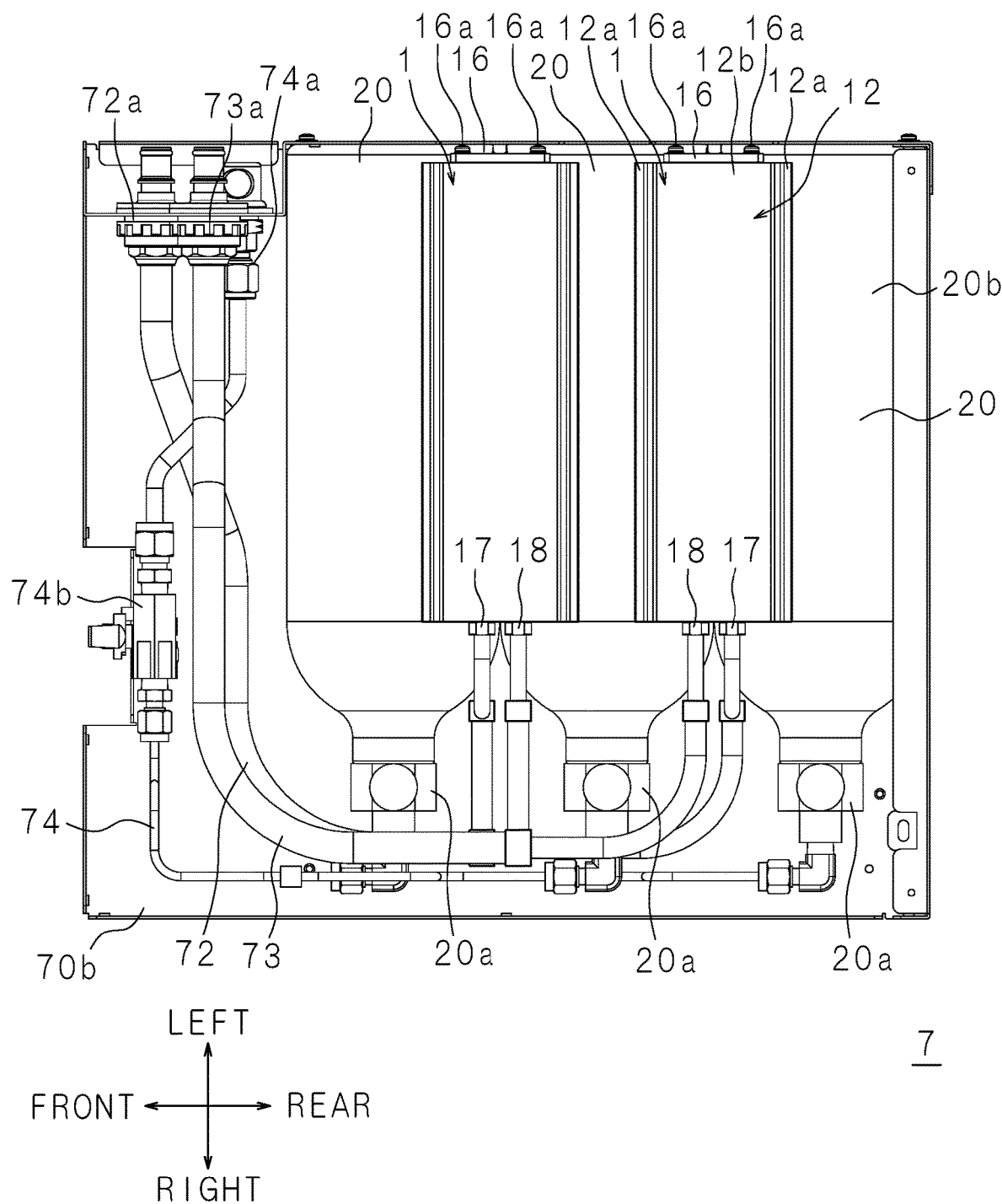
FIG. 5 is a plan view of an MH unit.
Figure 6:
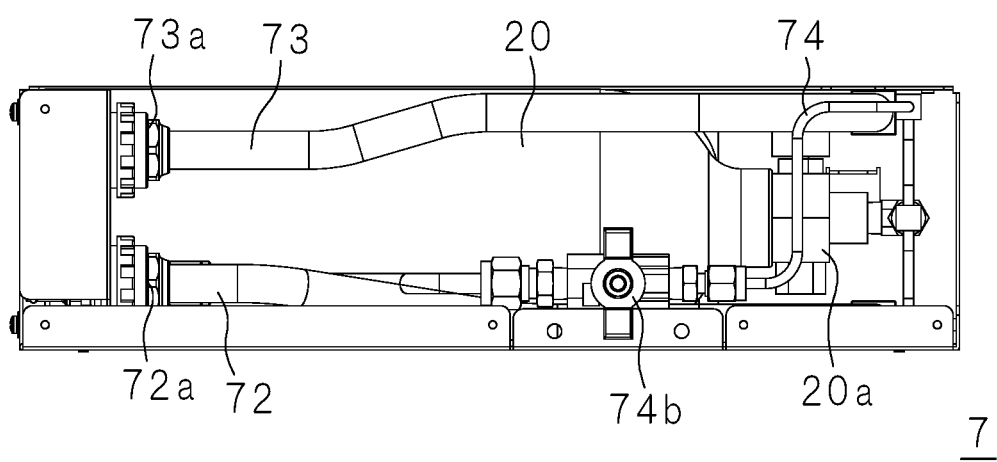
FIG. 6 is a front view of an MH unit.
Figure 7:
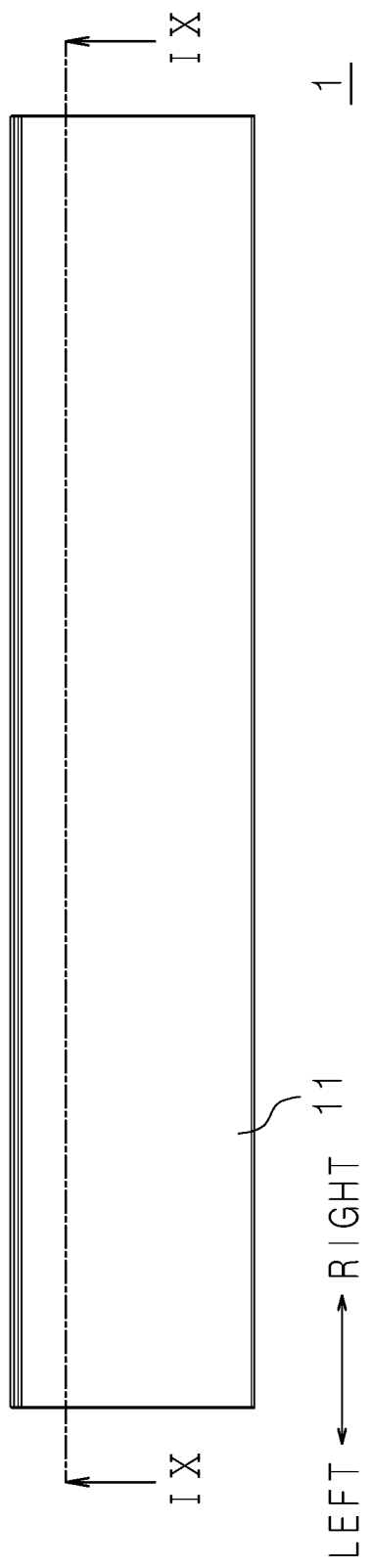
FIG. 7 is a side view of a temperature control member on the front upper side.
Figure 8:
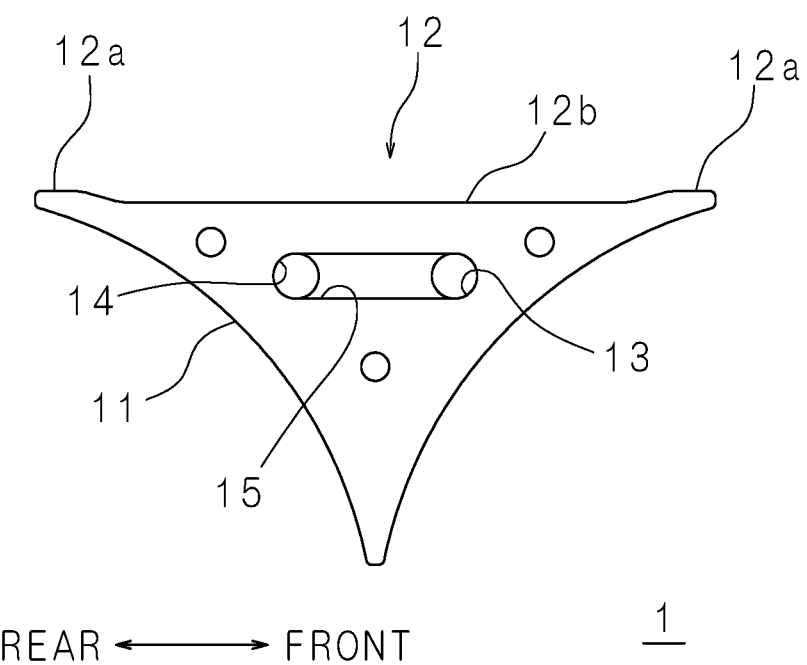
FIG. 8 is a rear view of a temperature control member of FIG. 7.
Figure 9:
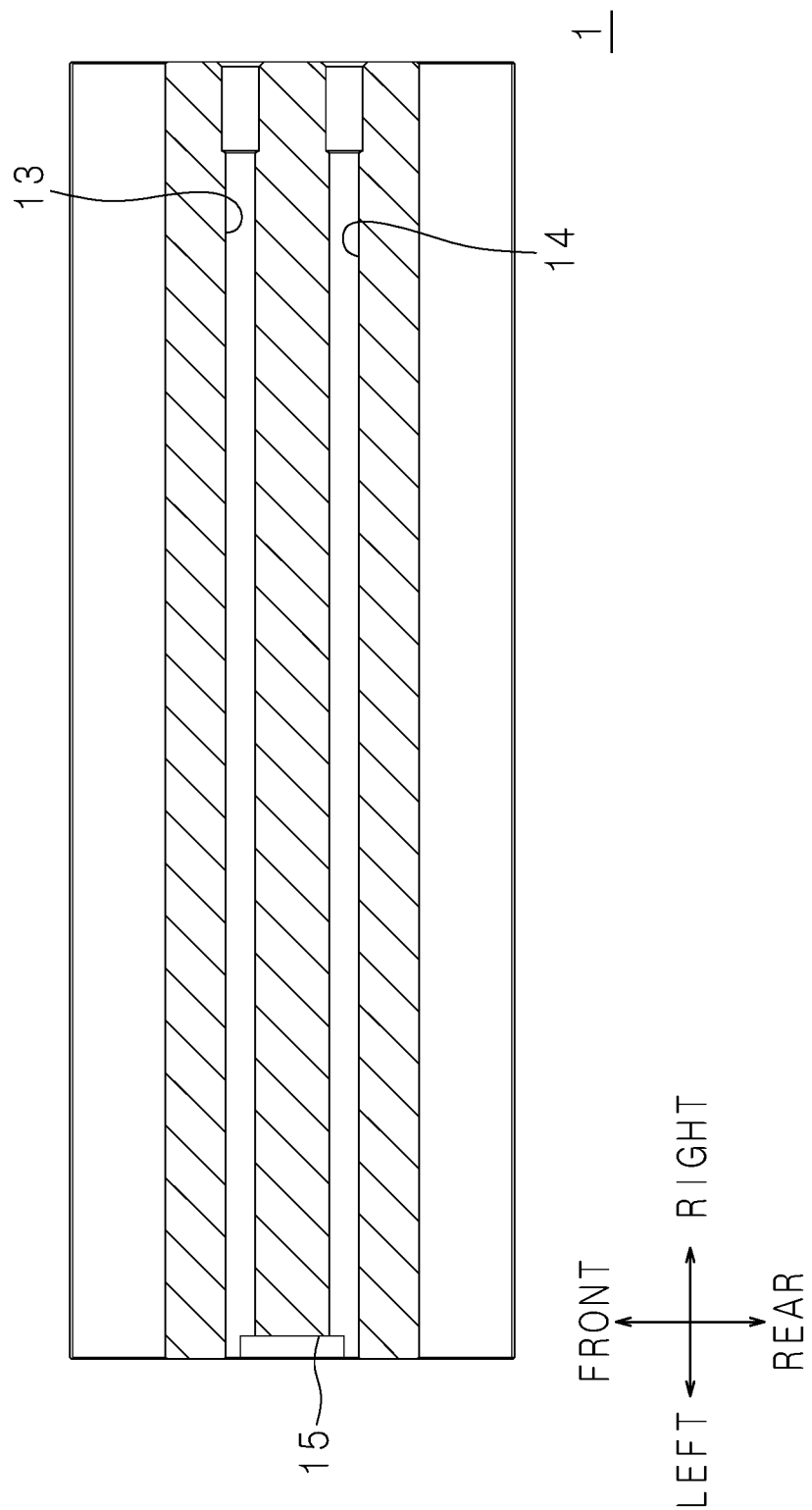
FIG. 9 is a sectional view taken along line IX-IX in FIG. 7.
Figure 10:
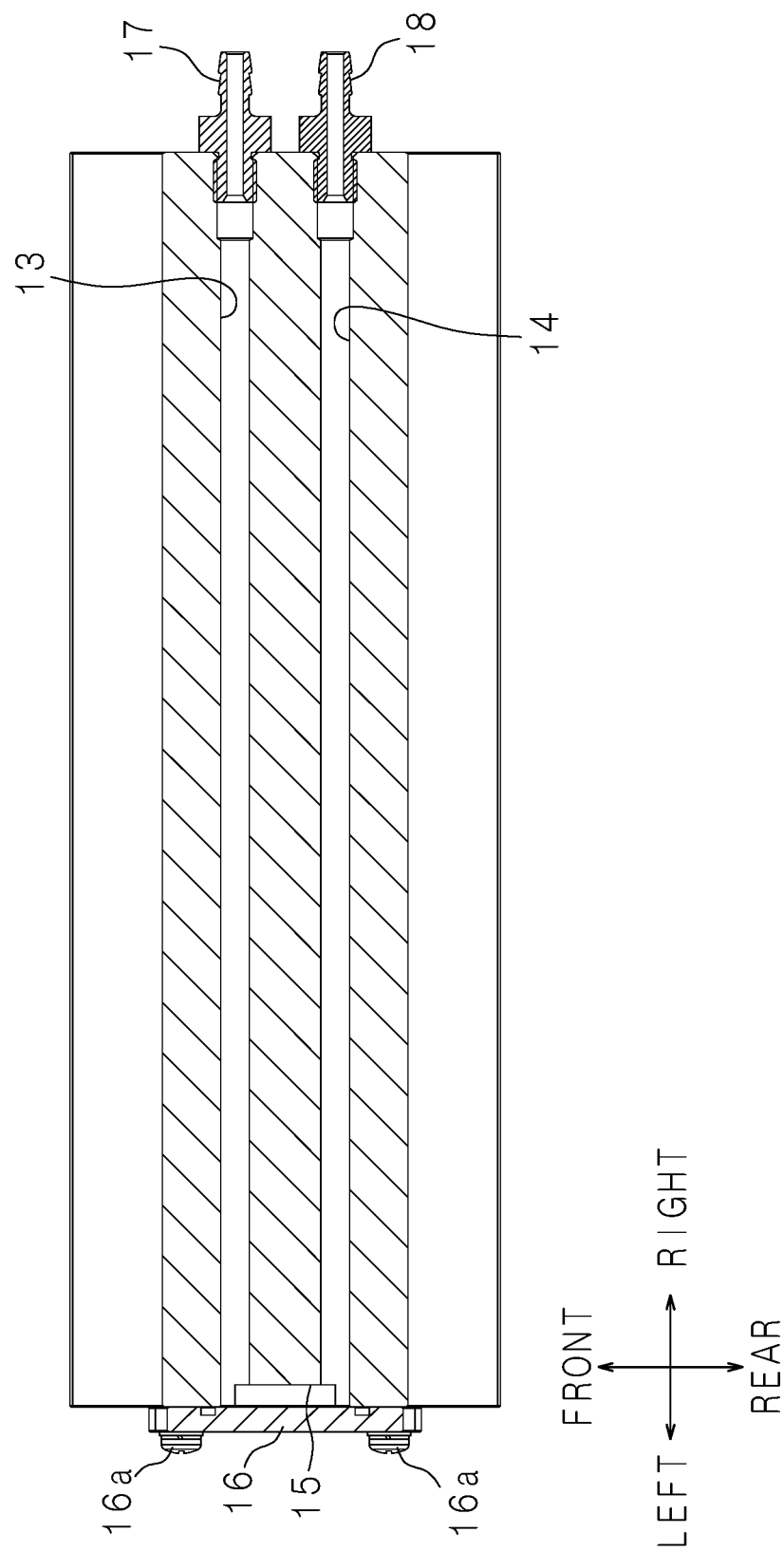
FIG. 10 is a sectional view illustrating a state where a closing plate, an inlet connection portion, and an outlet connection portion are attached to the temperature control member of FIG. 9.

FIG. 2 is a perspective view of an MH unit 7, FIG. 3 is a perspective view illustrating a state of the MH unit 7 where an upper plate portion 70a, a front plate portion 70c, and a right plate portion 70d are detached, FIG. 4 is a side view illustrating a state of the MH unit 7 viewed from the right side, FIG. 5 is a plan view of the MH unit 7, FIG. 6 is a front view of the MH unit 7, FIG. 7 is a side view of a temperature control member 1 on the front upper side, FIG. 8 is a rear view of the temperature control member 1, FIG. 9 is a sectional view cut along line IX-IX in FIG. 7, and FIG. 10 is a perspective view illustrating a state where a closing plate 16, an inlet connection portion 17, and an outlet connection portion 18 are attached to the temperature control member 1 of FIG. 9.

The MH unit 7 has: a plurality of temperature control members 1 interposed between the plurality of cylinders 20; a first flow passage 72; a second flow passage 73; a third flow passage 74; a first connection portion 72a; a second connection portion 73a; and a third connection portion 74a. Each cylinder 20 is filled with hydrogen absorbing alloy. A reaction to occur when the hydrogen absorbing alloy in the cylinder 20 releases hydrogen is an endothermic reaction.

As illustrated in FIG. 2, a housing 70 of the MH unit 7 has a rectangular parallelepiped shape and has an upper plate portion 70a, a lower plate portion 70b, a front plate portion 70c, a right plate portion 70d, a rear plate portion 70e, and a left plate portion 70f. A grip 71 is attached to a part of the front plate portion 70c slightly deviated leftward from the center. A plurality of MH units 7 are housed in a case while being layered as described above, and the grip 71 is used to take the MH unit 7 into or out of the case. A part of the front plate portion 70c slightly deviated rightward from the center is recessed inward, so that a manual opening/closing valve 74b is exposed.

A part of the left plate portion 70f close to the front is recessed inward. A first connection portion 72a through which heating liquid flows is provided at a lower portion of said part, a third connection portion 74a through which hydrogen flows is provided on the back side of the first connection portion 72a, and a second connection portion 73a through which heating liquid flows is provided on the upper side of the third connection portion 74a.

For example, three cylinders 20 are juxtaposed on the lower plate portion 70b at predetermined intervals as illustrated in FIGS. 3 to 6.

Each cylinder 20 is provided with a cylindrical portion 20b, and a bowl-shaped tip portion 20c having an opening/closing valve 20a.

A temperature control member 1 on the upper side is provided so as to fill a space surrounded by the upper plate portion 70a and the respective cylindrical portions 20b of two adjacent cylinders 20, and a temperature control member 1 on the lower side is provided so as to fill a space surrounded by the lower plate portion 70b and the respective cylindrical portions 20b of two adjacent cylinders 20. In FIG. 1, a temperature control member 1 on the lower side exists on the rear side in FIG. 1 of a temperature control member 1 on the upper side. To be provided so as to fill a space means, in other words, to be disposed in a space.

Each temperature control member 1 is made of aluminum, for example, has a triangular prism shape, and has two circular arc side faces 11 located along cylindrical portions 20b of two adjacent cylinders 20, and a planar side face 12 facing the upper plate portion 70a or the lower plate portion 70b. As illustrated in FIG. 3, the side face 12 has two contact portions 12a, which are provided on both end sides of the temperature control members 1 in the transverse direction and come into contact with the upper plate portion 70a or the lower plate portion 70b, and a concave portion 12b depressed toward the center. The length of each temperature control member 1 is substantially equal to the length of each cylindrical portion 20b in the crosswise direction, and a circular arc side face 11 and a cylindrical portion 20b are adhered to each other with an adhesive 19. That is, the length of each temperature control member 1 in the crosswise direction is set in a manner such that the contact area of a cylindrical part 20b and a circular arc side face 11 becomes as large as possible.

After two contact portions 12a are put into contact with the upper plate portion 70a or the lower plate portion 70b, and the adhesive 19 is applied to the circular arc side face 11, each cylinder 20 is put into contact with the circular arc side face 11 via the adhesive 19, so that the temperature control member 1 and the cylinder 20 are united. Although the shape of the temperature control member 1 is not limited to the above-described shape but may be another polygonal shape, the contact area of contact with the cylindrical portions 20b is made large.

As illustrated in FIGS. 8 to 10, each temperature control member 1 has a first flow hole 13 and a second flow hole 14, which penetrate in the longitudinal direction in parallel, and has a concave portion 15, which connects the first flow hole 13 and the second flow hole 14 and has an elliptic shape in side view, at a bottom face on the left plate portion 70f side. At the bottom face, end portions of the first flow hole 13 and the second flow hole 14, and the closing plate 16 configured to close the concave portion 15 are attached with three screws 16a. That is, an opening of the concave portion 15 is closed by the closing plate 16, and a hole that communicates with the first flow hole 13 and with the second flow hole 14 is formed. The inlet connection portion 17 and the outlet connection portion 18 are provided respectively at opposite end portions of the first flow hole 13 and the second flow hole 14.

Instead of providing the first flow hole 13 and the second flow hole 14 inside each solid temperature control member 1, a hollow temperature control member 1 may be used, and a flow tube through which heating liquid flows may be disposed inside. Here, more favorable thermal efficiency can be obtained in a case where the first flow hole 13 and the second flow hole 14 are provided inside a solid temperature control member 1, and the temperature control member 1 can be manufactured from a drawn material or an extruded material such as aluminum, for example.

Moreover, although it is possible to use piping to connect end portions on the cylinder 20 bottom face side of the first flow hole 13 and the second flow hole 14, the piping protrudes toward the left plate portion 70f side, and this increases the length of the housing 70 in the crosswise direction. In a case where the end portions are connected by the concave portion 15, and the end portion and the opening of the concave portion 15 are closed by the closing plate 16, the structure is simple, and it is unnecessary to increase the length of the housing 70 in the crosswise direction.

As illustrated in FIGS. 3 to 6, the first connection portion 72a is connected with the first flow passage 72 in the housing 70. The first flow passage 72 extends along the crosswise direction of the lower plate portion 70b, is bent at an end portion in the crosswise direction, and extends along the front-back direction of the lower plate portion 70b. In addition, the first flow passage 72 is branched into a part extending toward a space between cylinders 20 and a part extending in the front-back direction at a position in the front-back direction corresponding to a space between two adjacent cylinders 20 on the front side. A part extending toward a space between the cylinders 20 is further branched into a part extending toward the upper temperature control member 1 side and a part extending toward the lower temperature control member 1 side, and the parts are respectively connected with inlet connection parts 17 of the respective temperature control members 1. Moreover, a part extending in the front-back direction of the first flow passage 72 is bent at a position corresponding to a space between two adjacent cylinders 20 on the back side, extends toward a space between the cylinders 20, and is further branched into a part extending toward the temperature control member 1 on the upper side and a part extending toward the lower temperature control member 1 side, and the parts are connected respectively with inlet connection parts 17 of the respective temperature control members 1.

The second connection portion 73a is connected with the second flow passage 73. The second flow passage 73 is disposed in the housing 70 and above the first flow passage 72 in a state substantially parallel to the first flow passage 72. That is, the second flow passage 73 extends along the crosswise direction of the lower plate portion 70b, is bent at a substantially right angle at an end portion in the crosswise direction, extends along the front-back direction of the lower plate portion 70b, is branched, and is connected with outlet connection portions 18 of the respective temperature control members 1.

As illustrated in FIGS. 1 and 3, the arrangement in the front-back direction of the inlet connection portion 17 and the outlet connection portion 18 in the temperature control member 1 on the front side is opposite to that of the temperature control member 1 on the back side. In addition, since the cylinder 20 at the center of the three cylinders 20 in the front-back direction is heated by heating liquid, which flows through the second flow hole 14 that is the return passage of the temperature control member 1 on the front side and through the second flow hole 14 that is the return passage of the temperature control member 1 on the back side, the amount of heat transferred decreases and therefore a difference in the amounts of heat transferred among three cylinders 20 decreases in comparison with a case where the cylinder is heated by heating liquid which flows through the second flow hole 14 at the temperature control member 1 on the front side and flows through the first flow hole 13 at the temperature control member 1 on the back side.

As illustrated in FIGS. 3 to 6, the third connection portion 74a is connected with the third flow passage 74 in the housing 70. The third flow passage 74 extends along the crosswise direction of the lower plate portion 70b and above the first flow passage 72, is bent at a substantially right angle at an end portion of the crosswise direction, and extends along the front-back direction of the lower plate portion 70b. The opening/closing valve 74b is provided between a central portion and the end portion in the crosswise direction of the third flow passage 74. The third flow passage 74 is branched in the front-back direction and is connected with the opening/closing valves 20a of the respective cylinders 20.

Each third connection portion 74a of each MH unit 7 is connected with the manifold 28, and the manifold 28 is connected with the regulator 22 via an opening/closing valve 21. The hydrogen supply pressure is adjusted by the regulator 22.

A reaction to occur at the stack 10 is an exothermic reaction, and the stack 10 is cooled by cooling water that flows through the stack cooling passage 4. Heat of cooling water discharged from the stack 10 is conducted to heat radiation liquid in the first heat exchanger 41, the heat radiation liquid radiates heat in the radiator 51, and heat is radiated to outside of the cell body 100 by the fan 52. The heat radiation liquid cooled in the radiator 51 is delivered to the first heat exchanger 41.

In the stack cooling passage 4, heat of cooling water that flows through the first heat exchanger 41 and is introduced to the second heat exchanger 42 is conducted to heating liquid in the second heat exchanger 42. Cooling water cooled in the second heat exchanger 42 returns to the cooling pump 40 and is delivered to the stack 10.

In the cylinder heating passage 6, heating liquid is introduced from the first connection portion 72a of each MH unit 7 to the first flow passage 72, is divided, flows through the first flow hole 13 of each temperature control member 1 via the inlet connection portion 17, turns back on the bottom face of the temperature control member 1, flows through the concave portion 15, and flows through the second flow hole 14. After flowing as described above while heating each cylinder 20, the heating liquid is discharged from the outlet connection portion 18, flows through the second flow passage 73, joins, and flows out of the MH unit 7 from the second connection portion 73a. In addition, the heating liquid flows through the cylinder heating passage 6, flows through the second heat exchanger 42, and returns to the heating pump 60. Heating causes release of hydrogen from hydrogen absorbing alloy in the cylinders 20.

Hydrogen flows out of the opening/closing valve 20a of each cylinder 20, flows through the third flow passage 74, flows out of the MH unit 7 via the third connection portion 74a, and is delivered to the regulator 22 through the manifold 28 and the opening/closing valve 21.

For filling a cylinder 20 with hydrogen, the MH unit 7 is detached and conveyed to a hydrogen station, for example, the third connection portion 74a is connected with a hydrogen refilling tank or the like, hydrogen is introduced from the third connection portion 74a to the MH unit 7, caused to flow through the third flow passage 74, and is delivered to each cylinder 20. At this time, since a reaction that alloy absorbs hydrogen is an exothermic reaction, heating liquid such as cooling water, for example, is introduced from a separate circuit to the temperature control member 1, and fills hydrogen while cooling the cylinder 20. That is, cooling liquid is introduced from the first connection portion 72a to the first flow passage 72, and cooling liquid that flows through the first flow passage 72 is introduced from the inlet connection portion 17 of each temperature control member 1 to the first flow hole 13, flows through the first flow hole 13, the concave portion 15, and the second flow hole 14, cools each cylinder 20, and is then discharged from the outlet connection portion 18. Discharged cooling liquid is introduced to the second flow passage 73, flows through the second flow passage 73, and is discharged from the second connection portion 73a to the circuit.

Regarding the fuel cell system 300 according to this embodiment, the temperature control member 1 has the side face 12, which faces the upper plate portion 70a or the lower plate portion 70b, and the circular arc side face 11, which is located along side faces of the cylindrical portions 20b of adjacent cylinder 20, so as to form a shape to fill a space surrounded by cylindrical portions 20b of adjacent cylinders 20 and the upper plate portion 70a or the lower plate portion 70b as described above. Accordingly, the temperature control member 1 and the cylinders 20 are put into close contact, the contact area is large, heat is conducted from the temperature control member 1 to the cylinders 20 with high thermal efficiency, and the cylinder 20 is heated or cooled favorably. In addition, a gap between the housing 70 and the cylinders 20 can be effectively used, and it is possible to build the temperature control members 1 in the housing 70 without increasing the size of the housing 70.

Since the length of a temperature control member 1 substantially coincides with the length of a cylindrical portion 20b, the temperature control member 1 can be in contact with the cylindrical portion 20b over substantially the whole length of the cylindrical portion 20b, and heat can be conducted efficiently.

For heating a cylinder 20, waste heat from the stack 10 can be effectively used, since heating liquid subjected to heat exchange with cooling water that has cooled the stack 10 is caused to flow.

Regarding this embodiment in which the first flow holes 13 and the second flow holes 14 of the respective temperature control members 1 are connected in parallel, it is possible to heat a plurality of cylinders 20 uniformly.

In addition, since the first flow hole 13 and the second flow hole 14 of the temperature control member 1 are provided in parallel in the longitudinal direction of the temperature control member 1, heat is radiated uniformly, the temperature control member 1 can be manufactured easily from an extruded material such as aluminum, for example, as described above, and the manufacturing cost can be lowered.

Since the first flow hole 13 of the temperature control member 1 is connected with the second flow hole 14 on the bottom face side of the temperature control member 1, and the inlet connection portion 17 and the outlet connection portion 18 are provided on the tip portion 20c side of the cylinder 20, it is possible to simplify the structure of piping by concentrating piping only on the tip portion 20c side. Since piping is not provided on the bottom face side of the cylinder 20, that is, piping is not provided between the bottom face of the cylinder 20 and the left plate portion 70f of the housing 70, it is unnecessary to enlarge the housing 70, and the MR unit 7 becomes compact.

Since the side face 12 of the temperature control member 1 has the concave portion 12b, contact of the temperature control member 1 and the housing 70 decreases, and it is possible to reduce heat to escape toward the housing 70. It is to be noted that the side face 12 is not limited to have one concave portion 12b but may have a plurality of concave portions.

Since the circular arc side face 11 of the temperature control member 1 and the cylindrical portions 20b of the cylinders 20 are adhered to each other with the adhesive 19, the temperature control member 1 and the cylinders 20 can be put into close contact, the thermal efficiency is favorable, and rattling of the temperature control member 1 is eliminated.

Although Embodiment 1 describes a case where cooling water in the stack cooling passage 4 and heating liquid in the cylinder heating passage 6 are separate heat media, and heat is exchanged between the heat media, the present invention is not limited to such a case. Cooling water discharged from the stack 10 in the stack cooling passage 4 may be used as heating liquid in the cylinder heating passage 6. That is, the cooling passage 4 and the heating passage 6 may communicate with each other at the position of the second heat exchanger in FIG. 1.

Embodiment 2

An MH unit 7 of a fuel cell system 300 according to Embodiment 2 has a structure similar to the fuel cell system 300 according to Embodiment 1 except that a heat insulator 29 is provided between a concave portion 12b of a side face 12 of a temperature control member 1 and an upper plate portion 70a or a lower plate portion 70b facing the concave portion 12b.

Figure 11:
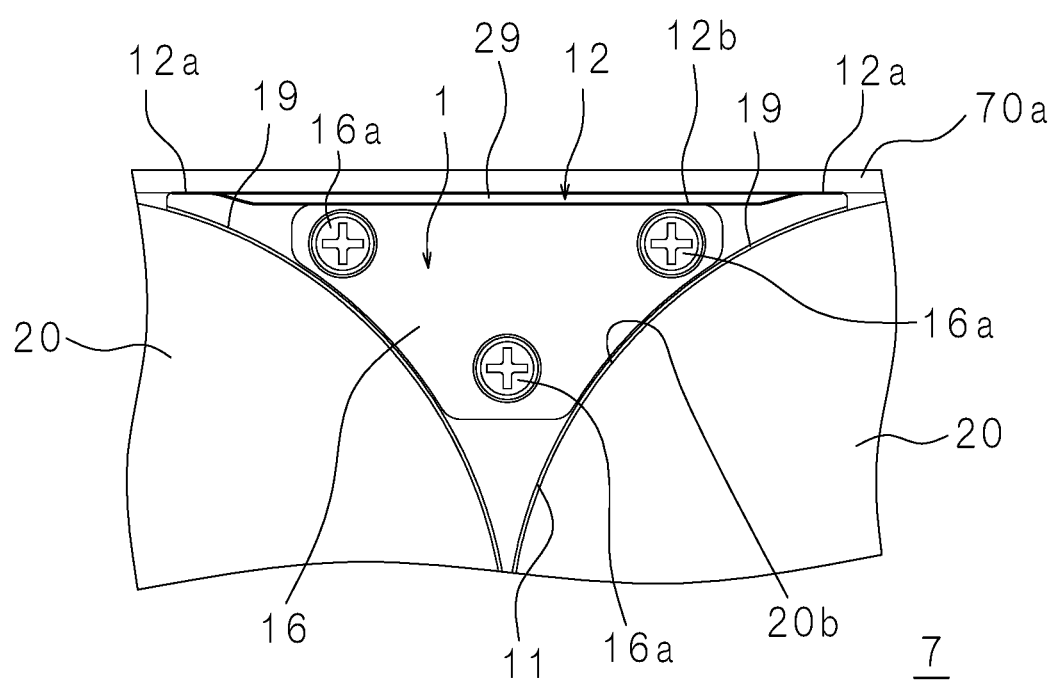
FIG. 11 is a partial side view illustrating a state of an MH unit according to Embodiment 2 viewed from the left side.

FIG. 11 is a partial side view illustrating a state of an MH unit 7 viewed from the left side, in which a left plate portion 70f is removed.

In FIG. 11, a long plate-like heat insulator 29 is inserted between a concave portion 12b and an upper plate portion 70a.

In Embodiment 2, the heat insulator 29 makes it possible to further reduce heat to escape toward the housing 70. Although the heat insulator 29 and the side face 70a of the housing 70 are in contact in FIG. 11, the heat insulator 29 and the side face 70a may be in no contact and have a space therebetween.

Embodiment 3

An MH unit 7 of a fuel cell system 300 according to Embodiment 3 has a structure similar to the fuel cell system 300 according to Embodiment 1 except that a heat conducting sheet 33 is interposed between a circular arc side face 11 of a temperature control member 1 and a cylindrical portion 20b of a cylinder 20 instead of the interposition of the adhesive 19.

Figure 12:
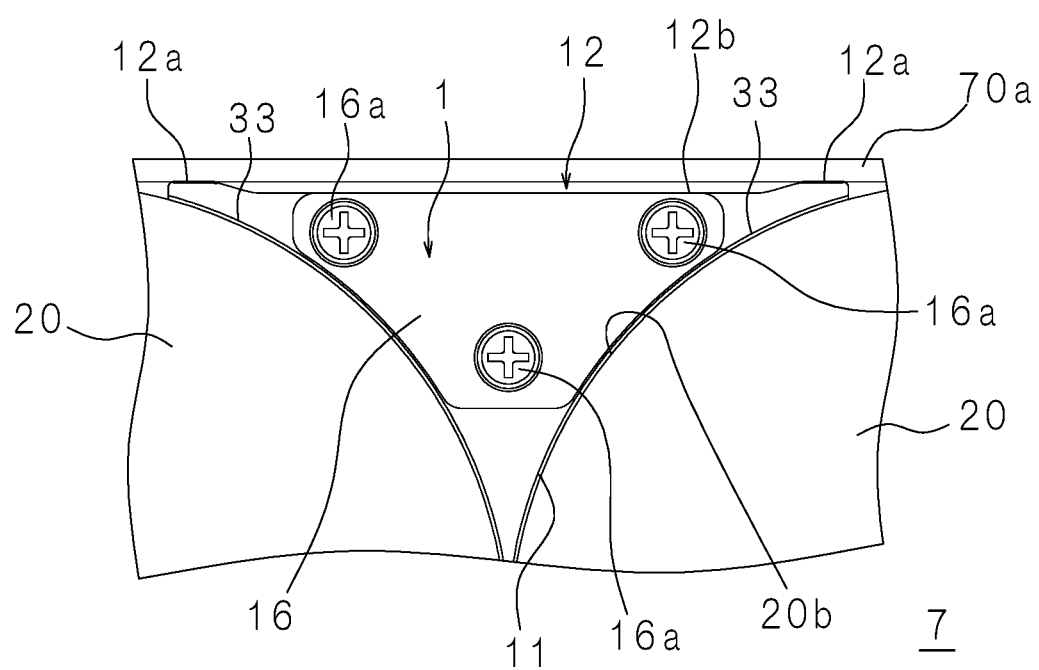
FIG. 12 is a partial side view illustrating a state of an MH unit according to Embodiment 3 viewed from the left side.

FIG. 12 is a partial side view illustrating a state of an MH unit 7 viewed from the left side, in which a left plate portion 70f is removed.

In FIG. 12, the heat conducting sheet 33 is interposed between a circular arc side face 11 and a cylindrical portion 20b.

In Embodiment 3, the heat conducting sheet 33 makes it possible to conduct heat from the temperature control member 1 to the cylinder 20 more favorably.

Embodiment 4

A side face 12 of a temperature control member 1 of a fuel cell system 300 according to Embodiment 4 does not have the contact portion 12a and the concave portion 12b and has a planar shape.

Figure 13:
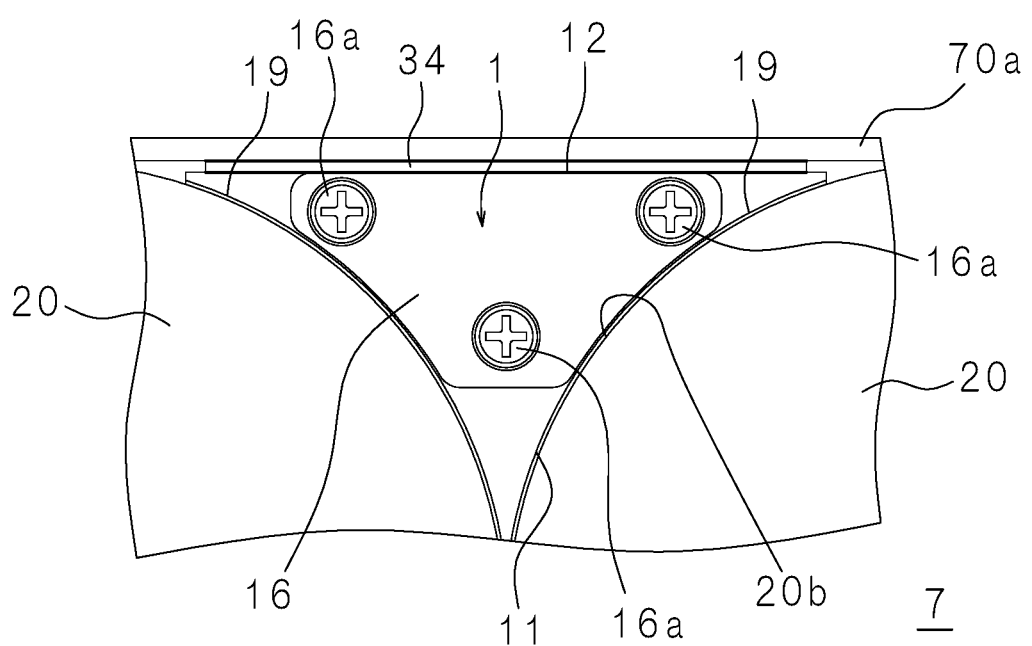
FIG. 13 is a partial side view illustrating a state of an MH unit according to Embodiment 4 viewed from the left side.

FIG. 13 is a partial side view illustrating an MH unit 7 viewed from the left side, in which a left plate portion 70f is removed.

In Embodiment 4, a support plate 34 is interposed between an upper plate portion 70a and a side face 12 of a temperature control member 12 on the upper side, and a circular arc side face 11 and a cylindrical portion 20b are adhered to each other with an adhesive 19 in a state where a temperature control member 1 having two circulate arc side faces 11 to which the adhesive 19 is applied is fixed to two adjacent cylinders 20 as illustrated in FIG. 13. Similarly, a support plate 34 is interposed between a lower plate portion 70b and a side face 12 of a temperature control member 1 on the lower side, and a circular arc side face 11 and a cylindrical portion 20b are adhered to each other with the adhesive 19 in a state where the temperature control member 1 is fixed to two adjacent cylinders 20.

In addition, by drying the adhesive 19 and then pulling out the support plate 34, gaps are generated between the upper plate portion 70a and the side face 12 of the temperature control member 1 on the upper side and between the lower plate portion 70b and the side face 12 of the temperature control member 1 on the lower side. Accordingly, heat escape toward the housing 70 is suppressed, and the insulation effectiveness is further improved.

As described above, a hydrogen storage unit 7 according to the present disclosure is characterized by comprising: a housing 70; a plurality of cylinders 20 that are housed in the housing 70 and include hydrogen absorbing alloy; and a temperature control member 1 that is housed in the housing 70 and has a heat medium flowing through the temperature control member 1 so as to heat or cool the cylinders 20.

In the present disclosure, the temperature control member 1 makes it possible to heat or cool a cylinder 20 with favorable thermal efficiency.

A hydrogen storage unit 7 according to the present disclosure is characterized in that the storage container 20 has a cylindrical shape, and the temperature control member 1 has a shape to fill a space surrounded by side faces 20b of adjacent cylinders 20 and the side face 70a or 70b of the housing 70. For example, the temperature control member 1 on the upper side and the temperature control member 1 on the lower side illustrated in FIG. 4 may be connected with each other. Moreover, in a case where the cylinders 20 and the side face 70a of the housing 70 are not in contact with each other, for example, the temperature control member 1 on the front side and the temperature control member 1 on the back side may be connected with each other.

Regarding the present disclosure in which the temperature control member 1 has a shape to fill a space surrounded by side faces 20b of adjacent cylinders 20 and the side face 70a (or 70b) of the housing 70, the temperature control member 1 and the cylinders 20 are put into close contact, and heat is conducted from the temperature control member 1 to the cylinders 20 without any loss. In addition, a gap between the housing 70 and the cylinders 20 can be effectively used, and it is possible to build the temperature control member 1 in the housing 70 without increasing the size of the housing 70.

A hydrogen storage unit 7 according to the present disclosure is characterized in that the cylinder 20 has a cylindrical shapes, and the temperature control member 1 has a side face 12 facing the side face 70a (or 70b) of the housing 70, and a circular arc side face 11 located along the side faces 20b of adjacent cylinders 20.

Regarding the present disclosure in which the temperature control member 1 has a shape to enlarge the contact area of contact with the cylinders 20, heat can be conducted with more favorable thermal efficiency. In other words, the area where the temperature control member 1 and the cylinders 20 can directly exchange heat increases, and heat can be exchanged with high efficiency.

A hydrogen storage unit 7 according to the present disclosure is characterized by having a gap 12b between the side face 12 of the temperature control member 1 and the side face 70a (or 70b) of the housing 70 facing said side face 12.

Regarding the present disclosure, the gap 12b makes it possible to decrease the contact area of the temperature control member 1 and the housing 70 and to reduce heat to escape toward the housing 70. In other words, it is possible to reduce heat exchange other than heat exchange between the temperature control member 1 and the cylinders 20. This increases the quantity of heat to be exchanged between the temperature control member 1 and the cylinders 20.

A hydrogen storage unit 7 according to the present disclosure is characterized by having a heat insulator 29 between the side face 12 of the temperature control member 1 and the side face 70a (or 70b) of the housing 70 facing said side face 12.

Regarding the present disclosure, the heat insulator 29 makes it possible to further reduce heat to escape toward the housing 70. In other words, it is possible to reduce heat exchange other than heat exchange between the temperature control member 1 and the cylinders 20. That is, the quantity of heat to be exchanged between the temperature control member 1 and the cylinders 20 increases.

A hydrogen storage unit 7 according to the present disclosure is characterized in that the cylinder 20 has a cylindrical part 20b, and a tip part 20c provided with an opening/closing valve 20a, and the temperature control member 1 has a length that substantially coincides with the length of the cylindrical part 20b.

Regarding the present disclosure in which the temperature control member 1 can be in contact with the cylindrical parts 20b of the cylinders 20 over substantially the whole length of the cylindrical parts 20b, heat can be conducted with high thermal efficiency. In other words, the contact area of the temperature control member 1 and the cylinders 20 can be enlarged. That is, heat is exchanged between the temperature control member 1 and the cylinders 20 with high thermal efficiency.

A hydrogen storage unit 7 according to the present disclosure is characterized in that the cylinders 20 are juxtaposed in the housing 70, a plurality of temperature control members 1 are provided in the housing 70, the temperature control members 1 have a flow passage 13 and a flow passage 14, through which the heat medium flows, inside the temperature control member 1, and the respective flow passages 13 and flow passages 14 of the respective temperature control members 1 are arranged in parallel and are connected with each other on one end side of the temperature control members 1.

Regarding the present disclosure in which the flow passages 13 and the flow passages 14 are connected in parallel, it is possible to heat a plurality of storage containers 20 uniformly.

A hydrogen storage unit 7 according to the present disclosure is characterized in that the flow passage 13 and the flow passage 14 are provided parallel to the longitudinal direction of the temperature control members 1.

Regarding the present disclosure in which heat can be conducted uniformly and the temperature control member 1 can be manufactured from a drawn material or an extruded material such as aluminum, for example, the manufacturing cost can be lowered.

A hydrogen storage unit 7 according to the present disclosure is characterized in that the flow passage 13 and the flow passage 14 are a forward passage 13 and a return passage 14 formed to fold back on the other end side of the temperature control members 1, and the inlet connection portion 17 through which the heat medium in the forward passage 13 is introduced, and the outlet connection portion 18 through which the heat medium in the return passage 14 is discharged are provided on the tip 20c side of the cylinder 20.

Regarding the present disclosure in which piping is connected only on the tip 20c side of the cylinder 20, the structure of the piping becomes simple. Since the piping is connected collectively in one direction, for example, assembling and maintenance become easy. In addition, since there is no piping on a side opposite to the tip 20c side, that is, there is no piping between the bottom face of the temperature control member 1 and the inner wall 70f of the housing 70, it is unnecessary to enlarge the housing 70, and the hydrogen storage unit 7 becomes compact.

A hydrogen storage unit 7 according to the present disclosure is characterized in that the forward passage 13 and the return passage 14 are holes that respectively penetrate the temperature control member 1 in the longitudinal direction, a concave portion 15 that connects an end portion of the forward passage 13 and an end portion of the return passage 14 is provided on the other end side of the temperature control member 1, and a closing plate 16 that is put in contact with the end portions and closes the end portions and the concave portion 15 is provided.

In a case where piping to connect the end portions to each other is provided on the other end side, it is necessary to enlarge the housing 70 correspondingly. In the present disclosure, the structure is simple, and it is unnecessary to enlarge the housing 70.

A hydrogen storage unit 7 according to the present disclosure is characterized in that the temperature control member 1 and the cylinders 20 are adhered to each other.

Regarding the present disclosure, the adhesive 19 can put the temperature control member 1 and the cylinders 20 into close contact, and the thermal efficiency is improved. Moreover, rattling of the temperature control member 1 is eliminated.

A fuel cell system 300 according to the present disclosure is characterized by comprising: any one of hydrogen storage units 7 described above; a stack 10 configured to react hydrogen and oxygen so as to generate electricity; and a cooling passage 4 configured to cool the stack 10 by circulation of a heat medium, and a heat medium to flow through the temperature control member 1 uses a heat medium which has cooled the stack 10 or exchanges heat with said heat medium.

With the present disclosure, waste heat from the stack 10 is effectively used by using a heat medium which has cooled the stack 10 or by exchanging heat with said heat medium, and the heat temperature control member 1 of the present disclosure makes it possible to conduct heat to the cylinder 20 with favorable thermal efficiency.

It is to be noted that, as used herein and in the appended claims, the singular forms "a", "an", and "the" include plural referents unless the context clearly dictates otherwise.

The present disclosure is not limited to the contents of the embodiments described above, and various modifications can be employed. That is, the technical scope of the present disclosure also includes embodiments obtained by combining technical measures modified arbitrarily within the claims. For example, the number of cylinders 20, the number of temperature control members 1, and the shape of temperature control members 1 are not limited to the case described in the embodiments.

What is claimed is:

1. A hydrogen storage unit comprising:
   a housing;
   a plurality of storage containers that are housed in the housing and include hydrogen absorbing alloy; and
   a temperature control member that is housed in the housing and has a heat medium flowing through the temperature control member so as to heat or cool the storage containers; wherein
   the temperature control member has a flow passage, through which the heat medium flows, inside the temperature control member,
   the flow passage has a forward passage and a return passage formed to fold back on the other end side of the temperature control member, and
   an inlet connection portion through which the heat medium in the forward passage is introduced, and an outlet connection portion through which the heat medium in the return passage is discharged are provided in a direction in which an opening valve of the storage container is provided,
   the inlet connection portion and the outlet connection portion are located on one end side of the temperature control members,
   the forward passage and the return passage are holes that respectively penetrate the temperature control member in the longitudinal direction,
   a concave portion that connects an end portion of the forward passage and an end portion of the return passage is provided on the other end side of the temperature control member, and
   a contact plate that is put into contact with an end portion of the forward passage and an end portion of the return passage and closes the end portions and the concave portion is provided,
   the concave portion is formed inner than an end surface of the temperature control member.

2. The hydrogen storage unit according to claim 1, wherein
   the storage container has a cylindrical shape, and
   the temperature control member has a shape to fill a space surrounded by side faces of adjacent storage containers and a side face of the housing.

3. The hydrogen storage unit according to claim 1, wherein
   the storage container has a cylindrical shape, and
   the temperature control member has a side face facing a side face of the housing, and a circular arc side face located along side faces of adjacent storage containers.

4. The hydrogen storage unit according to claim 2, wherein
   the storage container has a cylindrical shape, and
   the temperature control member has a side face facing a side face of the housing, and a circular arc side face located along side faces of adjacent storage containers.

5. The hydrogen storage unit according to claim 3, wherein the hydrogen storage unit has a gap between the side face of the temperature control member and a side face of the housing facing the side face.

6. The hydrogen storage unit according to claim 3, wherein the hydrogen storage unit has a heat insulator between the side face of the temperature control member and a side face of the housing facing the side face.

7. The hydrogen storage unit according to claim 5, wherein the hydrogen storage unit has a heat insulator between the side face of the temperature control member and a side face of the housing facing the side face.

8. The hydrogen storage unit according to claim 2, wherein
   the storage container has a cylindrical part, and a tip part provided with an opening/closing valve, and
   the temperature control member has a length that substantially coincides with a length of the cylindrical part.

9. The hydrogen storage unit according to claim 8, wherein
   the storage containers are juxtaposed in the housing,
   a plurality of temperature control members are provided in the housing, and
   respective flow passages of the plurality of temperature control members are arranged in parallel and are connected with each other on the one end side of the temperature control members.

10. The hydrogen storage unit according to claim 9, wherein the flow passages are provided parallel to a longitudinal direction of the temperature control members.

11. The hydrogen storage unit according to claim 10, wherein
    the flow passage has a forward passage and a return passage formed to fold back on the other end side of the temperature control member, and
    an inlet connection portion through which the heat medium in the forward passage is introduced, and an outlet connection portion through which the heat medium in the return passage is discharged are provided in a direction in which an opening valve of the storage container is provided.

12. The hydrogen storage unit according to claim 1, wherein the temperature control member and the storage containers are adhered to each other.

13. A fuel cell system comprising:
a hydrogen storage unit according to claim 1;
a power generation unit configured to react hydrogen and oxygen so as to generate electricity; and
a power generation unit cooling passage configured to cool the power generation unit by circulation of a heat medium,
wherein a heat medium to flow through the temperature control member is a heat medium which has cooled the power generation unit.

14. A fuel cell system comprising:
a hydrogen storage unit according to claim 2;
a power generation unit configured to react hydrogen and oxygen so as to generate electricity; and
a power generation unit cooling passage configured to cool the power generation unit by circulation of a heat medium,
wherein a heat medium to flow through the temperature control member is a heat medium which has cooled the power generation unit.

15. A fuel cell system comprising:
a hydrogen storage unit according to claim 3;
a power generation unit configured to react hydrogen and oxygen so as to generate electricity; and
a power generation unit cooling passage configured to cool the power generation unit by circulation of a heat medium,
wherein a heat medium to flow through the temperature control member is a heat medium which has cooled the power generation unit.

16. A fuel cell system characterized by comprising:
a hydrogen storage unit according to claim 1;
a power generation unit configured to react hydrogen and oxygen so as to generate electricity;
a power generation unit cooling passage configured to cool the power generation unit by circulation of a heat medium; and
a heat exchanger in which a heat medium that flows through the temperature control member and a heat medium that has cooled the power generation unit exchange heat with each other, wherein
the heat medium that flows through the temperature control member is different from the heat medium that has cooled the power generation unit.

17. A fuel cell system comprising:
a hydrogen storage unit according to claim 2;
a power generation unit configured to react hydrogen and oxygen so as to generate electricity;
a power generation unit cooling passage configured to cool the power generation unit by circulation of a heat medium; and
a heat exchanger in which a heat medium that flows through the temperature control member and a heat medium that has cooled the power generation unit exchange heat with each other, wherein
the heat medium that flows through the temperature control member is different from the heat medium that has cooled the power generation unit.

18. A fuel cell system comprising:
a hydrogen storage unit according to claim 3;
a power generation unit configured to react hydrogen and oxygen so as to generate electricity;
a power generation unit cooling passage configured to cool the power generation unit by circulation of a heat medium; and
a heat exchanger in which a heat medium that flows through the temperature control member and a heat medium that has cooled the power generation unit exchange heat with each other, wherein
the heat medium that flows through the temperature control member is different from the heat medium that has cooled the power generation unit.

\* \* \* \* \*